United States Patent
Cone

[11] 4,002,447
[45] Jan. 11, 1977

[54] GLASS BEAD FORMING NOZZLES AND METHOD

[75] Inventor: Eugene J. Cone, Yorba Linda, Calif.

[73] Assignee: PPG Industries, Inc., Pittsburgh, Pa.

[22] Filed: Sept. 2, 1975

[21] Appl. No.: 609,632

[52] U.S. Cl. .................................. 65/21; 65/142
[51] Int. Cl.² ...................................... C03B 19/10
[58] Field of Search ............... 65/1, 12, 21, 142; 29/1.22; 264/15

[56] References Cited

UNITED STATES PATENTS

| | | | |
|---|---|---|---|
| 2,908,036 | 10/1959 | Russell | 65/12 |
| 3,294,503 | 12/1966 | Machlan et al. | 65/1 |
| 3,843,340 | 10/1974 | Cone | 65/21 |

OTHER PUBLICATIONS

The Manufacturing Technology of Continuous Glass Fibres, K. L. Loewenstein, Elsevier Scientific Pub. Co., 1973, pp. 93–95.

*Primary Examiner*—Robert L. Lindsay, Jr.
*Attorney, Agent, or Firm*—Dennis G. Millman

[57] ABSTRACT

The diameters of glass beads formed by jetting molten glass through an orifice are changed without a shutdown by employing an orifice nozzle having a tapered tip. With such a nozzle, the bead diameter is changed by changing the velocity with which the glass is forced through the nozzle. This may be accomplished by changing either the pressure or the viscosity. Alternatively, the bead diameter can be changed by using interchangeable nozzles having different lengths.

4 Claims, 3 Drawing Figures

GLASS BEAD FORMING NOZZLES AND METHOD

BACKGROUND OF THE INVENTION

This invention relates to an improvement in the process for producing glass beads described in U.S. Pat. No. 3,843,340 to Eugene J. Cone, entitled "Method and Apparatus for Producing Glass Beads", the disclosure of which is hereby incorporated by reference. In that process, beads of a predetermined size are formed by melting glass to a low viscosity and forcing it through an orifice to form a jet which breaks apart into beads. The process is particularly useful for making glass beads which are subsequently phase separated and leached to form the microporous catalyst supports disclosed in U.S. Pat. application Ser. No. 311,191, filed Dec. 1, 1972, by J. J. Hammel et al., now U.S. Pat. No. 3,843,341.

It has been found desirable to produce glass beads in various sizes for different end uses, but the bead forming process as taught in U.S. Pat. No. 3,843,340 would require that the orifice nozzle be removed and rebuilt in order to change bead sizes, a cumbersome and disruptive process. Furthermore, attempting to make larger beads by merely increasing the orifice diameter can lead to undesirable consequences because enlarging the orifice not only increases the thickness and velocity of the glass jet, but also would require a higher pressure to obtain a controlled jetting action. As a result, the total glass throughput is greatly increased, thereby necessitating a larger melter in order to assure adequate residence time for thorough melting. And when a fluid bath is being used to catch and cool the beads, an increased throughput can cause the fluid being used to become overheated. Thus it would be highly desirable to be able to change bead sizes quickly and easily, without unduly interrupting production, and without entailing a major redesign of the process equipment.

SUMMARY

It has now been found that by jetting glass through an orifice nozzle having its discharge end tapered outwardly, the diameter of the glass beads produced can be varied by changing the velocity of the glass being forced through the nozzle. The velocity can be changed by controlling the viscosity of the glass or the pressure on the glass.

The viscosity is a function of the glass temperature, and the pressure can be controlled by either imposing a pressurized inert gas above the molten glass in the melter or varying the height of molten glass standing above the nozzle. At higher velocities, a narrow jet of glass is projected from the nozzle and smaller diameter beads are formed, while at lower velocities a thicker jet emerges from the flared nozzle tip, resulting in larger diameter beads. The use of the flared nozzle thus permits the bead size to be changed by merely modifying temperature and/or pressure.

In another embodiment of the invention, the velocity in the nozzle, and thus the bead size, is determined by the length of the nozzle. Greater flow resistance through a longer nozzle is accompanied by slower velocity. Therefore, in conjunction with a flared nozzle tip, it has been found that a longer nozzle forms larger beads, and a shorter nozzle forms smaller beads. Although this embodiment requires the furnace to be shut down in order to change nozzles, it is preferred in many cases because it does not involve any changes in the melting conditions nor does it require a gas-tight melting vessel.

DRAWINGS

DETAILED DESCRIPTION

Figure 1:
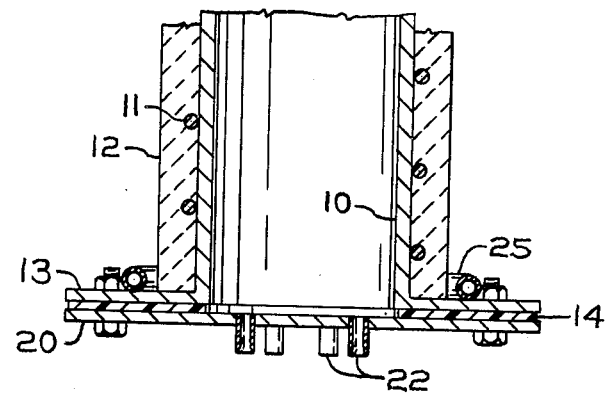
FIG. 1 is a cross-sectional view of a typical discharge neck portion of the bottom of a glass melting vessel for making glass beads.

Referring to FIG. 1, there is shown a cylindrical discharge neck 10, usually made of a corrosion resistant material such as platinum, which extends from the bottom of a glass melting vessel (not shown). Details of the melter, as well as the overall bead forming process, may be found in the aforesaid U.S. Pat. No. 3,843,340 to Cone, and need not be repeated here. A modified melter and neck structure which is particularly well-adapted for use with the present invention is disclosed in U.S. Pat. application Ser. No. 488,116, filed July 12, 1974, by R. A. Caripolti, now abandoned, the disclosure of which is hereby incorporated by reference. Other specific melter and neck designs will lend themselves to use with the present invention, therefore the neck structure is shown somewhat schematically in the drawings here.

Figure 2:
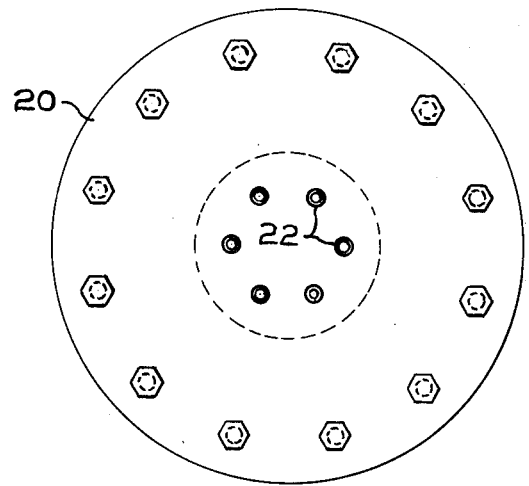
FIG. 2 is a bottom elevation of the neck shown in FIG. 1 showing details of a multiple nozzle arrangement.

Neck 10 is heated by resistance heater 11 and is encased in a refractory sheath 12. The lower end of the neck is provided with a flange 13 to which is bolted an orifice plate 20, gasketed with a fibrous refractory material 14 such as that sold under the trade name "Fiberfrax". The orifice plate is fitted with a plurality of nozzles 22, which may be arranged in a circle, as shown in FIG. 2 Six nozzles are shown for purposes of illustration, but the number may be greater or smaller. A water pipe 25 contacts flange 13 to cool the connection and solidify any leaking glass.

Figure 3:
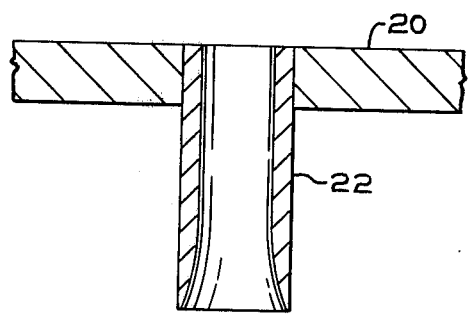
FIG. 3 is an enlarged cross-sectional view of a flared-tip nozzle in accordance with the present invention.

As shown in FIG. 3, the nozzles of the present invention are provided with an inside diameter which flares outwardly at the lower end. At higher velocities, it has been found that the glass jet leaves the nozzle with substantially the same diameter as the inner diameter of the narrower, straight portion of the nozzle. When the velocity is reduced, the glass apparently follows the contour of the nozzle orifice along its entire length, so that the glass jet assumes a diameter approximately equal to the inside diameter of the nozzle at the flared end. In either case, the beads which form from the falling jets have diameters about twice that of the jets.

Specific dimensions for the nozzle will depend on a number of process parameters such as the composition of the particular glass used, the glass temperature in the neck portion of the melter, and size of beads desired. The following specific examples are for the case of a glass having the following composition by weight on the oxide basis:

| | |
|---|---|
| $SiO_2$ | 40.0% |
| $Na_2O$ | 9.5% |
| $B_2O_3$ | 50.5% |

The temperature of the glass in the neck was maintained at about 1250° C., at which temperature the glass had a viscosity of about 10 poises. The glass was jetted through a nozzle 5/16 inch (80 millimeters) long, with an inside diameter of about 0.08 inches (2 millimeters) and flaring out to 0.1 inch (2.5 millimeters). The taper began about ⅛ inch (32 millimeters) from the bottom of the nozzle. Under an imposed pressure of 1 to 2 pounds per square inch (70 to 140 grams/cm$^2$) beads were produced having an average diameter of about 3 millimeters at a flow rate through each nozzle of about 10–15 lbs/hr (4.5 to 6.8 kg/hr). By lowering the imposed pressure to about 6 to 8 oz/in$^2$ (26 to 35 grams/cm$^2$), the average bead size was increased to about 5 millimeters. The flow rate through each nozzle was about 4 to 6 lbs/hr (1.9 to 2.8 kg/hr) for the 5 millimeter beads. The pressure in the foregoing examples represents the head pressure of the glass above the nozzles, and the pressure was changed by changing the level of molten glass (which had a density of about 2.2 grams per cubic centimeter) in the melter. If the melter is made substantially gas-tight, the pressure may be a combination of glass pressure and the pressure of an inert gas injected above the glass level, in which case the glass level need not be varied.

When making 3 millimeter beads as described in the above examples, the bead size may be increased to 5 millimeters without changing the pressure if the glass viscosity is approximately doubled. This represents a glass temperature drop of about 80° C.

Another approach to altering the glass velocity at the nozzle in order to change bead size is to change the length of the nozzle, which approach will be illustrated by the following example. The same alkali borosilicate glass described above was provided with a temperature of about 1250° C. in the neck of the melter and produced 5 millimeter beads when forced at about 3 to 5 lbs/hr. (1.3 to 2.3 kg/hr) through a nozzle having the following dimensions: 1.2 inches (3.05 centimeters) in length, 0.07 inches (1.8 millimeters) in diameter in the straight portion and flaring out to 0.10 inch (2.5 millimeters) in diameter at the bottom with the flare initiating at about ⅛ inch (3.2 millimeters) from the bottom.

Beads having an average diameter of about 3 millimeters were produced at a rate of about 10 to 15 lbs/hr (4.5 to 6.8 kg/hr) when nozzles were substituted having these dimensions: 0.40 inch (1.0 cm) in length, 0.07 inch (1.8 millimeters) in diameter, flaring out to 0.10 inch (2.5 millimeters) at the bottom with the flare initiating about ⅛ inch (3.2 millimeters) from the bottom. All other process parameters remained essentially constant.

It is to be understood that other modifications and variations as are known to those of skill in the art may be resorted to without departing from the spirit and scope of the invention as defined by the appended claims.

I claim:

1. A method for forming beads of glass of a predetermined cross sectional size and shape comprising:
   establishing a flow of molten glass through an opening having a linearly extending first portion which is of uniform cross section and a second portion which is progressively larger in cross section, and
   alternately flowing the molten glass through said opening at a first velocity sufficient to cause a jet of glass issuing from said opening to assume the cross section of said first portion and at a second velocity sufficient to cause a stream of glass to issue from the opening with the cross section of said second portion, wherein said jet dissociates into freely falling beads of a first predetermined size and said stream dissociates into freely falling beads of a second, larger predetermined size.

2. The method of claim 1 wherein the velocity of the molten glass flowing through the opening is controlled by changing the viscosity of the glass entering the opening.

3. The method of claim 1 wherein the velocity of the molten glass flowing through the opening is controlled by changing the pressure on the glass entering the opening.

4. The method of claim 1 wherein the velocity of the molten glass flowing through the opening is changed by changing the length of the opening.

* * * * *